United States Patent Office 3,003,737
Patented Oct. 10, 1961

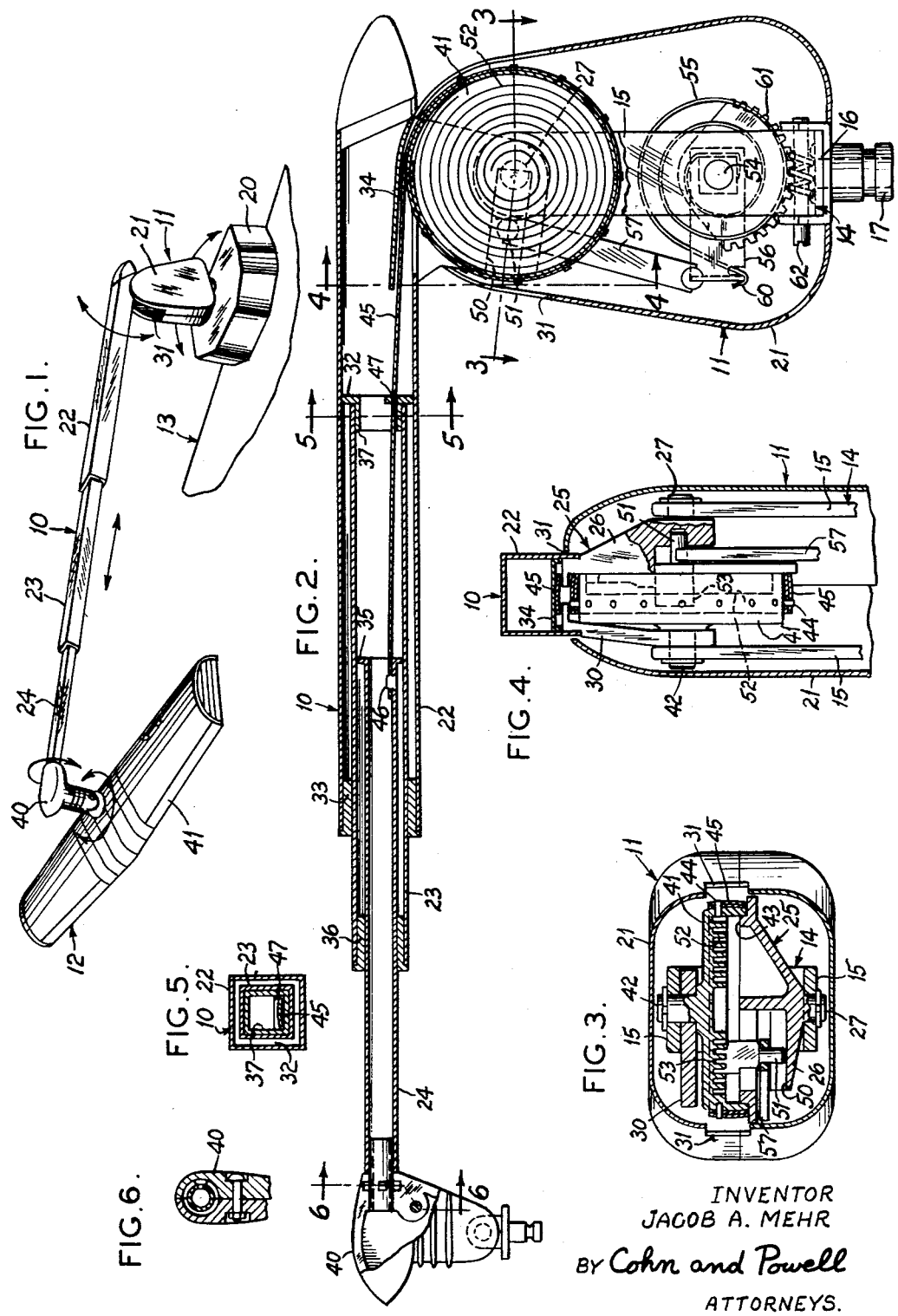

3,003,737
TELESCOPIC ARM UNIT
Jacob A. Mehr, Kirkwood, Mo., assignor to Dazor Manufacturing Corp., St. Louis, Mo., a corporation of Missouri
Filed Oct. 31, 1960, Ser. No. 66,224
20 Claims. (Cl. 248—286)

This invention relates generally to improvements in a telescopic arm unit, and more particularly to an improved mechanism for counterbalancing a pivotally mounted telescopic arm.

When a telescopic arm or boom mounted on a horizontal pivot axis is extended, the moment about such pivot axis is a direct function of the extension. If one of the heretofore conventional counterbalances is utilized to balance the arm when disposed at one certain position, such balanced condition is upset when the arm is telescopically adjusted to another position. An important object is to provide a counterbalance that operates automatically in response to the amount of arm extension so as to maintain a balanced condition.

An important object is achieved by the provision of a counterbalance operatively connected to a pivoted telescopic arm, and of a mechanism operatively interconnecting the counterbalance with the arm so as to shift the point of counterbalance connection relative to the pivot axis of the arm in response to telescopic action of the arm, and thereby maintain the desired balanced condition.

Another important object is provided by connecting a spring to a pin carried by the pivoted telescopic arm so as to exert a counterbalance force to the arm, and by providing a cam means that operates in response to telescopic action of the arm and engages the pin to move the pin selectively toward or away from the pivot axis of the arm.

Still another important object is afforded by providing a drum rotatably mounted on the base, and winding a tape on the drum, the tape being attached to one of the members constituting the telescopic arm, so that the drum revolves in response to telescopic action. A cam means on the drum engages the counterbalance pin to move the pin either toward or away from the arm axis depending upon the direction of drum rotation. Thus the counterbalance moment about the pivot axis is varied proportionately to the distance of the arm extension.

Yet another important object is realized by rotatively mounting the drum on the pivot axis of the arm and by providing a spiral cam track on the drum on which the pin rides. Guide means constrains movement of the pin in a direction toward or away from the pivot axis as the pin moves relatively along the spiral cam track upon rotation of the drum.

Another important object is achieved by the provision of a novel linkage for operatively interconnecting a wound spring with the movable pin so as to transmit a counterbalance force to the arm in all positions of the pin.

Other important advantages are realized in mounting the wound spring on a shaft that can be turned selectively by a gear connection in order to adjust precisely the wound tension of the spring.

Another important objective is to provide a counterbalance mechanism in a telescopic arm that is simple and durable in construction, economical to manufacture, efficient in operation, and which operates automatically upon telescopic action.

The foregoing and numerous other objects and advantages of the invention will more clearly appear from the following detailed description of a preferred embodiment, particularly when considered in connection with the accompanying drawing, in which:

FIG. 1 is a perspective view of the telescopic arm, illustrating the arm as supporting a lamp reflector;

FIG. 2 is a cross sectional view of the telescopic arm and counterbalance mechanism;

FIG. 3 is a cross sectional view as seen along line 3—3 of FIG. 2;

FIG. 4 is a cross sectional view as seen along line 4—4 of FIG. 2;

FIG. 5 is a cross section of the arm as seen along line 5—5 of FIG. 2, and

FIG. 6 is a cross sectional view of the reflector connection as seen along line 6—6 of FIG. 2.

Referring now by characters of reference to the drawing, and first to FIG. 1, it will be apparent that a telescopic arm generally indicated at 10 is pivotally mounted on a base referred to at 11, and that a functional object generally indicated at 12 is carried by the outermost end of arm 10. The base 11 is adapted to seat on or be attached to a supporting subjacent surface 13 such as a table top.

The base 11 includes a U-shaped frame 14 having spaced side arms 15 and a bottom web 16. Attached to the bottom web 16 is a vertical swivel 17 best shown in FIG. 2 adapted to be mounted in support member 20 (FIG. 1). Enclosing the counterbalance mechanism on base 11 is a housing 21 attached to and carried by the U-shaped frame 14.

The telescopic arm 10 consists of a plurality of arm members 22, 23 and 24, each being of tubular construction and of substantially square cross section in the preferred embodiment to prevent relative rotation.

The inner end of arm member 22 is attached to a split hub structure 25. One part 26 of the hub 25 includes an integral horizontal pivot pin 27 rotatively mounted in one side arm 15 of the U-shaped frame 14. The other part 30 of the hub 25 is pivotally mounted to the opposite frame arm 15 and on the same pivot axis, all in a manner described subsequently.

The telescopic arm 10 is vertically moveable about the pivot axis formed by pivot pin 27. The arm 22 and hub 25 extend out of housing 21 through the top opening 31 (FIGS. 1 and 2).

As is best seen in FIG. 2, the intermediate arm member 23 is slidably disposed within arm member 22. The inner end of arm member 23 is provided with a collar 32 adapted to engage a bearing 33 fixed to arm 22, the abutment of collar 32 with bearing 33 limiting the relative extension of arm members 22 and 23. A guide flange 34 fixed to the interior of arm 22 is adapted to engage the inner end of collar 32 of intermediate arm member 23 to limit retraction. The guide flange 34 has another function which will be described later.

The outermost arm member 24 is slidably disposed in arm member 23. A similar collar 35 is provided on the innermost end of arm member 24 and is adapted to engage a similar bearing 36 fixed to the outer end of arm member 23, whereby to limit relative extension. The collar 35 is adapted to abut an inner sleeve 37 formed on collar 32 to limit relative retraction.

A conventional type of swivel connection 40 is mounted on the outer end of arm member 24 and is adapted to carry a fluorescent lamp reflector 41. Of course, other functional objects may be conveniently and advantageously carried by the telescopic arm 10. For example, in lieu of the fluorescent reflector 41, an incandescent reflector or a microphone can be attached.

A drum 41 includes an integral pivot pin 42 adapted to mount the drum rotatively on the side member 15 of the U-shaped frame 14. More particularly, the pin 42 is located on the same pivot axis as pin 27. Consequently, the drum 41 rotates about the same axis on which arm 10 is pivoted. In fact, the other part 30 of the arm hub 25 is pivotally attached to the drum pin 42.

The drum 41 is disposed between the two parts 26 and 30 of arm hub 25. One side of drum 41 is recessed to provide a cup-like structure. To assist in positioning the drum 41, the hub part 26 includes an arcuate shoulder 43 that engages the inside rim of the drum.

The periphery of drum 41 is provided with a plurality of regularly spaced spokes 44. Wound on drum 41 is a flexible tape 45, the tape 45 being provided with a plurality of regularly spaced apertures adapted to receive the drum spokes 44. The free end of tape 45 is passed upwardly out of the housing 21 and into the interior of the arm 10. As is best seen in FIG. 2, the free end of tape 45 is fixed by fastener 46 to the outermost arm member 24.

The guide structure 34 engages the tape 45 as it leaves the drum 41 and enters the arm member 22. In addition, the flange 32 attached to the intermediate arm member 23 is provided with a slot 47 through which the tape 45 extends. The guide structure 34 and slot 47 serve to maintain the tape 45 in a fixed path of travel and thereby assure that the tape will be wound in position on drum 41.

As the arm 10 is extended, the tape 45 will unwind and cause rotation of drum 41 in a counterclockwise direction as viewed in FIG. 2. Conversely, when the arm 10 is retracted, the tape 45 is rewound on drum 41 and causes rotation of drum 41 in the opposite or clockwise direction.

The inner face of the hub part 26 is provided with a groove 50 that extends radially outward from the pivot axis defined by pin 27. The groove 50 constitutes a guide means for a pin 51 slidably disposed and carried by the arm hub part 26 in such groove 50. Movement of pin 51 is constrained by hub part 26 and groove 50 in a direction either toward or away from the pivot axis of the arm 10.

Formed in the inner face of drum 41 is a spiral cam track 52, the center of the spiral cam track being the pivot axis of the hub 25 as defined by the pins 27 and 42. The pin 51 is provided with a plurality of follower teeth 53 adapted slidably to interfit and ride in the spiral cam track 52. Upon rotation of drum 41 the follower teeth 53 of pin 51 move relatively along the spiral cam track 52. Because the pin 51 is constrained at the top and bottom by the engagement with the arm hub 25, the engagement of the follower teeth 53 with the cam track 52 causes movement of pin 51 along the groove 50 in a direction either toward or away from the pivot axis of the arm hub depending upon the direction of drum rotation.

Rotatively mounted between the side members 15 of the U-shaped frame 14 and located below the drum 41 is a shaft 54. Attached to shaft 54 is a spiral wound spring 55. Pivotally mounted free on shaft 54 is a first link 56, the link 56 extending laterally to the same side of the arm hub pivot axis 27 as does the radially extending hub groove 50. A second link 57 is pivotally attached to one end of the first link 56 and pivotally connected at the other end to the pin 51. The free end of wound spring 55 is provided with a hook 60 that engages the outer end of first link 56 in a manner so that the tension of spring 55 tends to rotate the first link 56 in an upward or clockwise direction as viewed in FIG. 2. The force exerted by spring 55 is thereby transmitted to the second link 57, and thence transmitted to the pin 51. It will be apparent that the spring 55 exerts a counterbalance force through pin 51 to the telescopic arm 10. Under balanced conditions, the counterbalance moment determined by the spring force exerted on pin 51 and the distance of pin 51 from the pivot axis 27 equals the arm moment.

Attached to shaft 54 and rotatable therewith is a segmental gear 61 that meshes with a worm gear 62 mounted on the frame 14. Adjustment of worm gear 62 causes a precise rotation of gear 61 and hence causes a corresponding rotation of shaft 54. This rotation of the shaft 54 in the manner described enables an adjustment of the spring tension. For example, the spring 55 can be wound tighter to increase the tension or can be loosened to decrease such tension.

It is thought that the operation and functional advantages of the counterbalance mechanism has become fully apparent from the foregoing detailed description of parts, but for completeness of disclosure the operation will be briefly described with reference to the extension and retraction of arm 10.

First, the worm gear 62 is adjusted to regulate and precisely determine the initial tension of spring 55. Rotation of worm gear 62 in one direction causes the intermeshing segmental gear 61 to rotate in one direction to tighten the spring and increase the spring tension. On the other hand, rotation of the worm gear 62 in the other direction causes the segmental gear 61 to loosen the spring 55 and thereby reduce the spring tension.

It will be assumed that the arm 10 is in a fully retracted position. Under this condition, the pin 51 is located close to the pivot axis 27. The force exerted on pin 51 by spring 55 in this position balances the arm 10 when fully retracted.

Upon extension of arm 10, it will be readily apparent that the center of gravity of such arm is being moved farther from the hub axis 27, thereby increasing the arm moment about such axis. To counterbalance this increased arm moment, the counterbalance moment must be increased proportionately.

As the arm 10 is extended, the tape 45 is unwound from drum 41 causing rotation of drum 41 in a counterclockwise direction as viewed in FIG. 2. The follower teeth 53 of pin 51 ride in the spiral cam track 52 and move relatively therealong upon such rotation. Because the pin 51 is constrained by hub slot 50, the pin 51 is moved outwardly away from the pivot axis 27 in the radially extending groove 50. The interengagement of the pin 51 with the cam track 52 moves the pin 51 outwardly proportionately to the extension of arm 10. In other words, the distance of pin 51 from the hub pivot axis 27 is increased proportionately to provide a counterbalance moment that continuously equals the increased arm moment.

The reverse action is achieved upon retraction of arm 10. For example, as the arm 10 is retracted, the tape 45 is rewound on drum 41 causing rotation of drum 41 in a clockwise direction as viewed in FIG. 2. The interengagement of the follower teeth 53 with the spiral cam track 52 causes movement of the pin 51 along the hub groove 50 in a direction toward the hub pivot axis 27. Movement of pin 51 in this direction reduces the counterbalance moment, and such movement is controlled so that the counterbalance moment at all times equals the arm moment upon retraction.

Although the invention has been described by making detailed reference to a single preferred embodiment, such detail is to be understood in an instructive, rather than in any restrictive sense, many variants being possible within the scope of the claims hereunto appended.

I claim as my invention:

1. In a telescopic arm unit, a base, a telescopic arm pivoted to said base, a drum rotatively mounted to said base, means wound on said drum and connected to said arm so as to revolve said drum upon extension and retraction of said arm, means interconnecting the arm with said drum and movable toward or away from the pivot axis of the arm upon rotation of the drum, and counterbalance means exerting a force on the last said movable means and hence to said arm in a direction to counter the weight of said arm.

2. In a telescopic arm unit, a base, a telescopic arm pivoted to said base, a drum rotatively mounted to said base, means wound on said drum and connected to said arm so as to revolve said drum upon extension and retraction of said arm, a spring, and means connecting the spring to said arm to exert a force in a direction relative to the pivot axis of said arm so as to counterbalance the weight of said arm, the last said means being interconnected to said drum so as to be shifted toward or away from the said pivot axis upon rotation of said drum.

3. In a telescopic arm unit, a base, a telescopic arm pivoted to said base, spring means connected to said arm at one side of the pivot axis of the arm to oppose the weight of said arm, and means connected to said arm operable to shift the connection of the spring means to the arm toward or away from the said pivot axis upon retraction or extension respectively of the arm, whereby to adjust the magnitude of the effective counterbalance force applied to the arm and whereby to maintain a counterbalanced condition.

4. In a telescopic arm unit, a base, a telescopic arm pivoted to said base, a drum rotatively mounted on said base, means interconnecting the drum to said arm for rotating the drum upon extension and retraction of said arm, a pin carried by said arm, spring means operatively connected to said pin and exerting a counterbalance force to said arm, and means interconnecting the drum and pin to shift the position of said pin relative to the pivot axis of the arm upon rotation of the drum, and thereby adjust the counterbalance moment applied to the arm.

5. In a telescopic arm unit, a base, an arm pivoted to said base, the arm including a plurality of telescopically related members, a drum rotatively mounted on said base, a flexible tape attached to and wound on said drum, said tape being attached to the outermost member of said arm, said tape rotating the drum upon extension and retraction of said arm, a pin carried by said arm, spring means operatively connected to said pin and exerting a counterbalance force to said arm, and means interconnecting the drum and pin to shift the position of said pin relative to the pivot axis of the arm upon rotation of the drum, and thereby adjust the counterbalance moment applied to the arm.

6. In a telescopic arm unit, a base, a telescopic arm pivoted to the base, a drum rotatively mounted on said base, means interconnecting the drum to said arm for rotating the drum upon extension and retraction of said arm, a pin carried by said arm, guide means embracing the pin and guiding the pin slidably toward or away from the pivot axis of said arm, spring means operatively connected to said pin and exerting a counterbalance force to said arm, and means interconnecting the drum and pin to shift the position of said pin relative to the pivot axis of the arm upon rotation of the drum, and thereby adjust the counterbalance moment applied to the arm.

7. In a telescopic arm unit, a base, a telescopic arm pivoted to said base, a drum rotatively mounted on said base, means interconnecting the drum to said arm for rotating the drum upon extension and retraction of said arm, a pin carried by said arm, guide means embracing the pin and guiding the pin slidably toward or away from the pivot axis of said arm, spring means operatively connected to said pin and exerting a counterbalance force to said arm, and cam means on said drum engaging said pin to move the pin along the guide means upon rotation of the drum, whereby to adjust the counterbalance moment applied to the arm.

8. In a telescopic arm unit, a base, a telescopic arm pivoted to said base, a pin carried by the arm, spring means operatively connected to said pin and exerting a counterbalance force to said arm, and cam means engaging said pin to move the pin toward or away from the pivot axis of said arm upon retraction or extension respectively of said arm, said cam means being operatively connected to said arm for actuation responsive to telescopic action of said arm.

9. In a telescopic arm unit, a base, a telescopic arm pivoted to said base, a pin carried by said arm, guide means embracing the pin and guiding the pin toward or away from the pivot axis of said arm, spring means on said base, a link pivoted to said pin and connected to said spring means for exerting a counterbalance force to said arm, means connected to said spring for adjusting the resilient force exerted on said pin, and cam means engaging said pin to move the pin toward or away from the pivot axis of said arm upon retraction or extension respectively of said arm, the cam means being operatively connected to said arm for actuation responsive to telescopic action of said arm.

10. In a telescopic arm unit, a base, a telescopic arm pivoted to said base, a drum rotatively mounted on said base, means interconnecting the drum to said arm for rotating the drum upon extension and retraction of said arm, a pin carried by said arm, spring means operatively connected to said pin and exerting a counterbalance force to said arm, the drum being provided with a curvilinear cam track, the pin including a follower engaging the cam track adapted to shift the position of said pin relative to the pivot axis of the arm upon rotation of the drum, and thereby adjust the counterbalance moment applied to the arm.

11. In a telescopic arm unit, a base, a telescopic arm pivoted to said base, a drum rotatively mounted on said base, about the pivot axis of said arm, means interconnecting the drum to said arm for rotating the drum upon extension and retraction of said arm, a pin carried by said arm, spring means operatively connected to said pin and exerting a counterbalance force to said arm, guide means engaging the pin and guilding the pin slidably toward or away from the pivot axis of said arm, the drum being provided with a spiral cam track, the pin including a follower engaging the cam track and shifting the position of said pin relative to the pivot axis of the arm upon rotation of the drum, and thereby adjust the counterbalance moment applied to the arm.

12. In a telescopic arm unit, a base, an arm pivoted to said base, said arm including a plurality of telescopically related members, a drum rotatively mounted on said base, a flexible tape attached to and wound on said drum, said tape being attached to the outermost telescopic member of said arm for rotating the drum upon telescopic action, a pin carried by said arm, guide means engaging the pin and guiding the pin toward or away from the pivot axis of said arm, spring means operatively connected to said pin and exerting a counterbalance force to said arm, and means interconnecting the drum and pin to shift the position of said pin relative to the pivot axis of the arm upon rotation of the drum, and thereby adjust the counterbalance moment applied to the arm.

13. In a telescopic arm unit, a base, an arm pivoted to said base, said arm including a plurality of telescopically related members, a drum rotatively mounted on said base on the pivot axis of said arm, a flexible tape attached to and wound on said drum, said tape being attached to the outermost telescopic member of said arm for rotating the drum upon extension and retraction of said arm, a pin carried by said arm and offset from said pivot axis, spring means operatively connected to said pin and exerting a counterbalance force to said arm, guide means embracing the pin and guiding the pin slidably toward or away from the pivot axis, the drum being provided with a spiral cam track, the pin including a follower engaging the cam track to shift the position of said pin relative to said pivot axis upon rotation of the drum, and thereby adjust the counterbalance moment applied to the arm.

14. In a telescopic arm unit, a base, a telescopic arm pivoted to said base, counterbalance means operatively connected to said arm, and means operatively interconnecting the counterbalance means with said arm to shift the point of connection relative to the pivot axis of said arm in response to telescopic action of said arm so as to maintain a balanced condition.

15. In a telescopic arm unit, a base, a telescopic arm pivoted to said base, a pin carried by said arm, a wound spring carried on the base, means interconnecting the wound spring with the pin for exerting a counterbalance force to said arm, and cam means engaging said pin to move the pin toward or away from the pivot axis of said arm upon retraction or extension respectively of said arm, said cam means being operatively connected to said arm for actuation responsive to telescopic action of said arm.

16. In a telescopic arm unit, a base, a telescopic arm pivoted to said base, a pin carried by said arm, a shaft mounted on said base, a spring wound on said shaft, means interconnecting the wound spring wtih said pin for exerting a counterbalance force to said arm, means operatively connected to said spring for adjusting the wound tension of said spring, and cam means engaging said pin to move the pin toward or away from the pivot axis of said arm upon retraction or extension respectively of said arm, said cam means being operatively connected to said arm for actuation responsive to telescopic action of said arm.

17. In a telescopic arm unit, a base, a telescopic arm pivoted to said base, a pin carried by said arm, a shaft mounted on said base, a spring wound on said shaft, means interconnecting the wound spring with said pin for exerting a counterbalance force to said arm, a gear element attached to said shaft and rotatable therewith, adjustment means meshing with said gear element for selectively turning the shaft to adjust the wound tension of said spring, and cam means engaging said pin to move the pin toward or away from the said pivot axis of said arm upon retraction or extension respectively of said arm, said cam means being operatively connected to said arm for actuation responsive to telescopic action of said arm.

18. In a telescopic arm unit, a base, a telescopic arm pivoted to said base, a pin carried by said arm, a wound spring carried on the base, a first link pivoted to said base, the spring being connected to said first link and tending to rotate said first link in one direction, and a second link interconnecting the said first link with said pin for exerting a counterbalance force to said arm, and cam means engaging said pin to move the pin toward or away from the pivot axis of said arm upon retraction or extension respectively of said arm, said cam means being operatively connected to said arm for actuation responsive to telescopic action of said arm.

19. In a telescopic arm unit, a base, an arm pivoted to said base, said arm including a plurality of telescopically related members, a drum pivoted to the base about the same pivot axis as said arm, a tape attached to and wound on said drum, the tape being attached to one of the arm members and adapted to wind and unwind on said drum upon telescopic action of said arm, a pin slidably mounted on said arm, the drum being provided with a spiral cam track, the pin engaging the cam track, means confining slidable movement of the pin toward or away from said pivot axis upon rotation of said drum, and a spring means operatively connected to said pin for exerting a counterbalance force to said arm, the pin being shiftable relative to said pivot axis to adjust the counterbalance moment responsive to the amount the arm members are extended.

20. In a telescopic arm unit, a base, an arm pivoted to said base, said arm including a plurality of telescopically related members, a drum pivoted to the base about the same pivot axis as said arm, a tape attached to and wound on said drum, the tape being attached to one of the arm members and adapted to wind and unwind on said drum upon telescopic action of said arm, a pin slidably mounted on said arm, the drum being provided with a spiral cam track, the pin engaging the cam track, guide means engaging the pin and confining slidable movement of the pin toward or away from said pivot axis upon rotation of said drum, a shaft mounted on said base, a spring attached to and wound on said shaft, a first link pivoted on said shaft, said spring engaging said first link and tending to rotate said first link in one direction, a second link pivotally attached to said first link and pivotally attached to said pin for exerting a counterbalance force to said arm, the pin being shiftable relative to said pivot axis to adjust the counterbalance moment responsive to the amount the arm members are extended.

References Cited in the file of this patent
UNITED STATES PATENTS

| | | |
|---|---|---|
| 1,644,231 | Bosworth | Oct. 4, 1927 |
| 2,299,251 | Perbal | Oct. 20, 1942 |